(12) United States Patent
Sakaguchi et al.

(10) Patent No.: US 9,557,113 B2
(45) Date of Patent: *Jan. 31, 2017

(54) DIRECT REDUCED IRON MANUFACTURING SYSTEM

(71) Applicant: MITSUBISHI HEAVY INDUSTRIES, LTD., Tokyo (JP)

(72) Inventors: Masakazu Sakaguchi, Tokyo (JP); Haruaki Hirayama, Tokyo (JP); Makoto Susaki, Tokyo (JP); Kazuo Ishida, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 231 days.

This patent is subject to a terminal disclaimer.

(21) Appl. No.: 14/352,922

(22) PCT Filed: Nov. 16, 2012

(86) PCT No.: PCT/JP2012/079765
§ 371 (c)(1),
(2) Date: Apr. 18, 2014

(87) PCT Pub. No.: WO2013/073662
PCT Pub. Date: May 23, 2013

(65) Prior Publication Data
US 2014/0252700 A1     Sep. 11, 2014

(30) Foreign Application Priority Data

Nov. 17, 2011    (JP) ................................ 2011-251966

(51) Int. Cl.
*F27D 17/00*      (2006.01)
*B01D 53/14*      (2006.01)
(Continued)

(52) U.S. Cl.
CPC ......... *F27D 17/004* (2013.01); *B01D 53/1418* (2013.01); *B01D 53/1462* (2013.01);
(Continued)

(58) Field of Classification Search
CPC .................................................... F27D 17/004
(Continued)

(56) References Cited

U.S. PATENT DOCUMENTS

| 2,547,685 | A | 4/1951 | Brassert et al. |
| 4,439,233 | A | 3/1984 | Faccone |

(Continued)

FOREIGN PATENT DOCUMENTS

| CA | 1 224 337 A | 7/1987 |
| CA | 2 719 602 A1 | 6/2011 |

(Continued)

OTHER PUBLICATIONS

English translation of Written Opinion dated Feb. 19, 2013, issued in counterpart International Application No. PCT/JP2012/079765 (6 pages).

(Continued)

*Primary Examiner* — Scott Kastler
(74) *Attorney, Agent, or Firm* — Westerman, Hattori, Daniels & Adrian, LLP

(57) ABSTRACT

Included are: a direct reduction furnace for reducing iron ore directly into reduced iron using a high-temperature reducing gas including hydrogen and carbon monoxide, an acid gas removal unit having an acid gas component absorber for removing, with an absorbent such as an amine-based solvent, acid gas components ($CO_2$, $H_2S$) in a reduction furnace flue gas discharged from the direct reduction furnace, and a regenerator for releasing the acid gas, and a degradation product removal unit for separating and removing a degra- (Continued)

dation product in the absorbent used by circulating through the absorber and the regenerator.

8 Claims, 7 Drawing Sheets

(51) Int. Cl.
*C21B 5/06* (2006.01)
*C21B 13/00* (2006.01)
*C21B 13/02* (2006.01)

(52) U.S. Cl.
CPC ............ *C21B 5/06* (2013.01); *C21B 13/0073* (2013.01); *C21B 13/02* (2013.01); *B01D 53/1425* (2013.01); *B01D 2252/204* (2013.01); *B01D 2256/16* (2013.01); *B01D 2256/20* (2013.01); *B01D 2258/025* (2013.01); *F27D 2017/007* (2013.01); *Y02P 10/122* (2015.11); *Y02P 10/136* (2015.11); *Y02P 10/212* (2015.11); *Y02P 10/265* (2015.11); *Y02P 10/283* (2015.11)

(58) Field of Classification Search
USPC ........................................................ 266/155
See application file for complete search history.

(56) References Cited

U.S. PATENT DOCUMENTS

| | | | |
|---|---|---|---|
| 4,477,419 A | 10/1984 | Pearce et al. | |
| 5,110,350 A | 5/1992 | Villarreal-Trevino et al. | |
| 5,858,057 A | 1/1999 | Celada-Gonzalez et al. | |
| 6,027,545 A | 2/2000 | Villarreal-Trevino | |
| 6,174,506 B1 | 1/2001 | Chakravarti et al. | |
| 8,496,730 B2 | 7/2013 | Metius et al. | |
| 8,940,076 B2 | 1/2015 | Duarte-Escareño et al. | |
| 2001/0026779 A1 | 10/2001 | Chakravarti et al. | |
| 2011/0092355 A1 | 4/2011 | Iijima et al. | |
| 2011/0125157 A1 | 5/2011 | Sharkey et al. | |
| 2011/0158891 A1 | 6/2011 | Nagayasu et al. | |
| 2011/0247457 A1 | 10/2011 | Knop et al. | |
| 2014/0252699 A1* | 9/2014 | Sakaguchi | B01D 53/1418 266/155 |
| 2014/0252700 A1* | 9/2014 | Sakaguchi | B01D 53/1418 266/155 |

FOREIGN PATENT DOCUMENTS

| | | |
|---|---|---|
| EA | 010000 B1 | 6/2008 |
| JP | 53-062718 A | 6/1978 |
| JP | 59-169920 A | 9/1984 |
| JP | 63-047308 A | 2/1988 |
| JP | 2001-019416 A | 1/2001 |
| JP | 2001-520310 A | 10/2001 |
| JP | 2011-104580 A | 6/2011 |
| JP | 2011-136258 A | 7/2011 |
| RU | 2069701 C1 | 11/1996 |
| WO | 99/19520 A1 | 4/1999 |
| WO | 2010/042023 A1 | 4/2010 |
| WO | 2011/012964 A2 | 2/2011 |

OTHER PUBLICATIONS

Decision of a Grant dated Aug. 11, 2015 issued in counterpart Eurasian Patent Office Application No. 2014117534, with English translation. ( 12 pages).
International Search Report, dated Feb. 19, 2013, issued in corresponding application No. PCT/JP2012/079765.
Decision of a Grant dated Aug. 11, 2015 issued in counterpart Russian Patent Office Application No. 2014117534, with English translation (12 pages).
International Search Report, dated Feb. 19, 2013, issued in International Application No. PCT/JP2012/079766 (counterpart to U.S. Appl. No. 14/350,928).
Written Opinion dated Feb. 19, 2013, issued in International Application No PCT/JP2012/079766 (counterpart to U.S. Appl. No. 14/350,928), with English translation (10 pages).
Official Decision of Grant dated Sep. 23, 2015, issued in Russian Patent Application No. 2014119934 (counterpart to U.S. Appl. No. 14/350,928), with English translation (20 pages).
Non-Final Office Action dated Dec. 4, 2015, issued in U.S. Appl. No. 14/350,928 (20 pages).
Office Action dated May 2, 2016, issued in Canadian Patent Application No. 2,856,293 (counterpart to U.S. Application No. 14/350,928). (3 pages).
Office Action dated May 4, 2016, issued in counterpart Canadian Patent Application No. 2,853,420. (4 pages).
Final Office Action dated Jun. 15, 2016, issued in U.S. Appl. No. 14/350,928. (11 pages).
Notice of Allowance dated Oct. 7, 2016, issued in U.S. Appl. No. 14/350,928. (9 pages).

* cited by examiner

DIRECT REDUCED IRON MANUFACTURING SYSTEM

FIELD

The present invention relates to a direct reduced iron manufacturing system.

BACKGROUND

Iron ore such as fine ore and lump ore is reduced in solid phase at, for example, approximately 1000° C. by synthesis gas to obtain direct reduced iron (DRI: Direct Reduced Iron). The direct reduction iron making method is low in usage rate of a reducing gas in a reduction furnace. Therefore, reduction furnace flue gas is returned to the reducing gas flow to be reused. Accordingly, efficiency is increased.

Water ($H_2O$) and carbon dioxide ($CO_2$) that are produced in the reduction furnace are inert in the reduction furnace. Therefore, it is necessary to remove them for reuse. The water is removed in a cooler or scrubber, and the carbon dioxide in, for example, a removal unit with an amine-based solvent or the like (Patent Literature 1).

CITATION LIST

Patent Literature

Patent Literature 1: Japanese Patent Application National Publication (Laid-Open) No. 2001-520310

SUMMARY

Technical Problem

However, a solvent degradation product of the amine-based solvent is generated by carbon monoxide (CO) and trace metal components, which are specific to fuel gas from a direct reduced iron making furnace, or heat in a reboiler of a regenerator in an acid gas removal unit. The resulting problems are not only that foaming occurs, which reduces acid gas removal performance and makes the operation difficult, but also that corrosion degradation of the acid gas removal unit occurs.

A known direct reduction process is controlled by replacing the amine-based solvent with a new one to reduce the concentration of the degradation products. Especially, a direct reduced iron making furnace system needs to replace the amine-based solvent with high frequency, which results in a problem that a large amount of a solvent is consumed.

Hence, a measure that eliminates the need of frequent replacement of the amine-based solvent and enables the promotion of a dramatic reduction in the amount of use of the amine-based solvent compared with before is desired to appear.

Considering the above problem, the present invention tackles a problem providing a direct reduced iron manufacturing system that can promote a reduction in the amount of use of an acid gas absorbent upon removal of acid gas such as $CO_2$ in the flue gas from the direct reduced iron making furnace.

Solution to Problem

According to a first aspect of the present invention in order to solve the problems, there is provided a direct reduced iron manufacturing system including: a direct reduction furnace for reducing iron ore directly into reduced iron using a high-temperature reducing gas including hydrogen and carbon monoxide; an acid gas removal unit including an acid gas component absorber for removing, with an absorbent, an acid gas component in a reduction furnace flue gas discharged from the direct reduction furnace, and a regenerator for releasing the acid gas; and a degradation product removal unit for separating and removing a degradation product in the absorbent used by circulating between the acid gas component absorber and the regenerator.

According to a second aspect of the present invention, there is provided the direct reduced iron manufacturing system according to the first aspect, further including: a bypass circuit for bypassing a part of a lean solvent to be returned from the regenerator to the absorber; and a filter interposed in the bypass circuit.

According to a third aspect of the present invention, there is provided the direct reduced iron manufacturing system according to the first or second aspect, further including: an introduction line for introducing the reduction furnace flue gas into the acid gas removal unit; a heat exchanger, interposed on the introduction line, for heat exchanging the reduction furnace flue gas; a bag filter provided upstream of the heat exchanger; and a scrubber provided downstream of the heat exchanger.

According to a fourth aspect of the present invention, there is provided the direct reduced iron manufacturing system according to any of the first to third aspects, wherein the acid gas absorbent has a low boiling point.

According to a fifth aspect of the present invention, there is provided the direct reduced iron manufacturing system according to any of the first to fourth aspects, wherein the high-temperature reducing gas is a gas produced from natural gas, coal gasification gas, or coke oven gas.

Advantageous Effects of Invention

According to the present invention, degradation products in an acid gas absorbent circulating through an absorber and a regenerator can be separated in a degradation product removal unit. Accordingly, the need of frequent replacement of the acid gas absorbent is eliminated, and it is possible to promote a dramatic reduction in the amount of use of the solvent compared with before.

Moreover, the concentration of the solvent degradation products is continuously controlled. Accordingly, it is possible to suppress the occurrence of foaming, achieve stable operation, and also suppress corrosion of equipment.

The stabilization of operation makes it possible to achieve the safe operation of the entire direct reduced iron process, and a reduction in cost by a reduction in the consumption amount of the solvent.

Furthermore, heat in the direct reduced iron process system is used to operate the degradation product removal unit. Accordingly, additional energy consumption is not required, which is economic.

DESCRIPTION OF EMBODIMENTS

Hereinafter, the present invention will be described in detail with reference to the drawings. The present invention is not limited by the embodiment(s). Moreover, if there is a plurality of embodiments, the present invention includes their combination. Moreover, the components in the embodiments include components that can easily be assumed by those skilled in the art or substantially the same components.

First Embodiment

Figure 1:
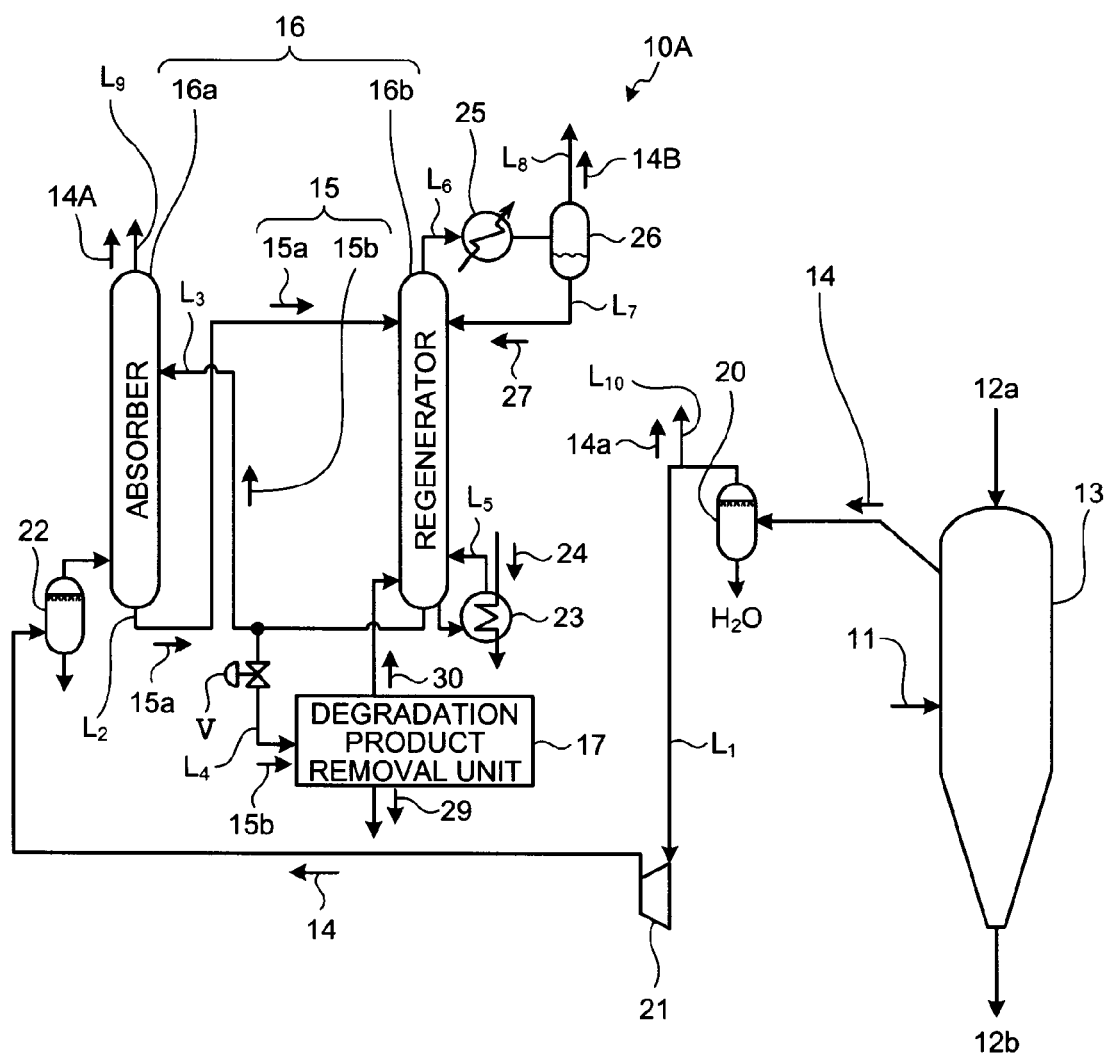
FIG. 1 is a schematic diagram of a direct reduced iron manufacturing system according to the first embodiment.

A direct reduced iron manufacturing system according to an embodiment by the present invention will be described with reference to the drawing. FIG. 1 is a schematic diagram of the direct reduced iron manufacturing system according to a first embodiment. As illustrated in FIG. 1, a direct reduced iron manufacturing system 10A includes a direct reduction furnace (hereinafter referred to as the "reduction furnace") 13 that reduces iron ore 12a directly into reduced iron 12b using a high-temperature reducing gas (hereinafter referred to as the "reducing gas") 11 including hydrogen and carbon monoxide, an acid gas removal unit 16 having an acid gas component absorber (hereinafter referred to as the "absorber") 16a for removing acid gas components ($CO_2$, $H_2S$) in a reduction furnace flue gas 14 discharged from the direct reduction furnace 13 with an acid gas absorbent (hereinafter referred to as the "absorbent") 15 such as an amine-based solvent, and a regenerator 16b for releasing the acid gas and regenerating the absorbent 15, and a degradation product removal unit 17 for separating and removing degradation products in the absorbent 15 that is used by circulating through the absorber 16a and the regenerator 16b.

In FIG. 1, a reference numeral 15a denotes a rich solvent, 15b a lean solvent, 20 a scrubber, 21a compressor, 22 a cooling scrubber, 23 a reboiler, 24 steam, 25 a cooler, 26 a gas-liquid separator, 27 condensed water, $L_1$ a gas supply line for introducing the reduction furnace flue gas 14 into the acid gas removal unit 16, $L_2$ a rich solvent line, $L_3$ a lean solvent line, $L_4$ a lean solvent branch line, $L_5$ a reboiler line for circulating the lean solvent in a lower part of the regenerator, $L_6$ a gas release line, $L_7$ a condensed water line, $L_8$ a recovery gas discharge line, $L_9$ a purified gas discharge line, and $L_{10}$ a gas discharge line.

The reducing gas 11 is heated up to a predetermined high temperature (for example, 900 to 1,050° C.) when being introduced into the reduction furnace 13.

The iron ore 12a is supplied from a top of the reduction furnace 13 where the reducing gas 11 is introduced, and the supplied iron ore 12a moves toward the furnace's bottom side. At this point in time, the iron ore (iron oxide) 12a is reduced into the reduced iron 12b by hydrogen ($H_2$) and carbon monoxide (CO), which are main components of the reducing gas 11, in countercurrent contact with the high-temperature reducing gas 11 simultaneously supplied from a side of the reduction furnace 13 as well as the hydrogen ($H_2$) and carbon monoxide (CO) are respectively inverted into water ($H_2O$) and carbon dioxide ($CO_2$).

The reduced iron 12a is taken out as the reduced iron 12b from a lower side of the reduction furnace 13.

Moreover, the hydrogen ($H_2$) and carbon monoxide (CO) in the reducing gas 11 are not used up in the reduction furnace 13, and the majority of the hydrogen ($H_2$) and carbon monoxide (CO) stays unused and discharged as the reduction furnace flue gas 14 into the gas supply line $L_1$.

The reduction furnace flue gas 14 from the reduction furnace 13 contains dust generated from the reduction furnace 13, such as iron powder, which has an adverse effect on the operation of the acid gas removal unit 16 connected on the downstream side. Therefore, the scrubber 20 removes the dust as well as the water ($H_2O$) produced in the reduction furnace 13.

The reduction furnace flue gas 14 is pressurized by the compressor 21 interposed on the gas supply line $L_1$ and then introduced into the cooling scrubber 22. In the cooling scrubber 22, the gas is decreased in temperature by cooling water, and then introduced into the absorber 16a of the acid gas removal unit 16.

In the absorber 16a, the acid gas of $CO_2$ and $H_2S$ is removed from the reduction furnace flue gas 14 by a chemical absorption reaction of the absorbent 15 to form a purified gas 14A from which the acid gas has been removed, and the purified gas 14A is discharged into the purified gas supply line $L_9$ from a top side.

The purified gas 14A contains the unused $H_2$ and CO and accordingly it may be configured such that the purified gas 14A joins the reducing gas 11 and is reused as the reducing gas 11 (which is described below).

In order to avoid the accumulation of $CH_4$ and $N_2$ being system inert components contained in the reduction furnace flue gas 14 in the system, it is configured such that a part 14a of the gas emitted from the scrubber 20 is discharged out of the system through the gas discharge line $L_{10}$ branching from the gas supply line $L_1$ on a downstream side of the scrubber 20.

In the absorber 16a in the acid gas removal unit 16, the absorbent 15 absorbs and removes the acid gas components of $CO_2$ and $H_2S$ from among CO, $H_2$, $CO_2$, and $H_2S$ contained in the reduction furnace flue gas 14.

The absorbent 15 that has absorbed $CO_2$ and $H_2S$ in the absorber 16a is referred to as the rich solvent 15a. The rich solvent 15a is supplied to the regenerator 16b side through the rich solvent line $L_2$. The rich solvent 15a introduced into the regenerator 16b releases the absorbed $CO_2$ and $H_2S$ in the regenerator by the heat of steam heated in the reboiler 23 to form the lean solvent 15b. The lean solvent 15b is returned again to the absorber 16a through the lean solvent line $L_3$ to be circulated and reused.

A cooling part (not illustrated) for removing the entrained absorbent in the purified gas 14A is provided on an upper side of the absorber 16a.

Moreover, in the regenerator 16b, a recovery gas 14B mainly including the $CO_2$ and $H_2S$ that have been released from the rich solvent 15a is discharged out of the system from its top through the gas release line $L_6$.

The recovery gas 14B is cooled in the cooler 25 interposed on the gas release line $L_6$. The condensed water 27 is then separated from the recovery gas 14B in the gas-liquid separator 26. The separated condensed water 27 is returned into the regenerator 16b through the condensed water line $L_7$.

The reduction furnace flue gas 14 from the reduction furnace 13 contains a lot of CO and iron components, and those that cannot be removed in the scrubber 20 interposed on the gas supply line $L_1$ may mix in the acid gas removal unit 16.

Moreover, a part of the absorbent 15 causes a chemical reaction with such CO and iron components by the long-time operation and accordingly degradation products are produced and processing capacity is reduced.

The degradation product from CO produces formic acid by dissolving CO in the reduction furnace flue gas 14 in the absorbent 15, and the formic acid reacts with the absorbent such as an amine-based solvent to form salts, which are heat stable salts and are accumulated in the absorbent 15.

The heat stable salts are accumulated in the absorbent system to cause, for example, an increase in the boiling point of the absorbent.

If the boiling point is increased, an increase in temperature in the reboiler 23 of the regenerator 16$b$ promotes the heat degradation of the solvent and reduces the heat efficiency of the reboiler 23, which are not preferable.

Moreover, if viscosity is increased, a pressure loss is increased and foaming occurs, which are not preferable.

Moreover, the degradation product from iron is produced by the degradation of the absorbent. For example, if an amine-based solvent is used as the absorbent, its degradation leads to the production of glycines such as bicine (N,N-Bis (2-hydroxyethyl)glycine). Such glycines form iron and a chelate complex to prevent film formation on an iron surface while involving a trivalent iron complex in a reduction-oxidation reaction to encourage the dissolution of iron and promote corrosion in an accelerative manner, which are not preferable.

Especially, dust from the iron ore, which flows from the reduction furnace 13, has a large specific surface area. Accordingly, a sudden formation of an iron complex is expected.

Moreover, the absorbent 15 itself is decomposed by being heated in the reboiler 23 to produce a degradation component. Accordingly, the absorption capacity of the acid gas is reduced.

The absorbent 15 is circulated/reused as the rich solvent 15$a$ and the lean solvent 15$b$. Accordingly, the above degradation products are accumulated in the absorbent 15, which causes a reduction in processing capacity and corrosion of equipment.

Hence, the present invention is configured so as to provide the lean solvent branch line $L_4$ that branches from the lean solvent line $L_3$ for returning the absorbent from the regenerator 16$b$ to the absorber 16$a$, provide the degradation product removal unit 17 to the lean solvent branch line $L_4$, separate/remove the degradation products, and regenerate the absorbent. The lean solvent 15$b$ supplied to the lean solvent branch line $L_4$ is controlled in accordance with the opening/closing of a valve V interposed on the lean solvent branch line $L_4$.

The degradation product removal unit 17 is provided to reduce the concentration of the degradation products accumulated in the absorbent 15, recover or maintain the performance of the absorbent 15, and maintain and control the performance of the absorbent 15 over a long period of time.

For the degradation product removal unit 17, there are an absorbent regeneration method by distillation using a difference in boiling point between the absorbent 15 used and the degradation products, a method for concentrating and separating the degradation products by electrodialysis, a method for separating the degradation products by ion exchange, and their combination.

A reclaimer of the absorbent regeneration method includes, for example, a heat exchanger reclaimer.

If the degradation products are to be removed, when one or both of the degradation products from CO and the degradation products from Fe exceed their reference values, the valve V is opened to supply a part of the lean solvent 15$b$ to the degradation product removal unit 17, and start the operation of removing the degradation products.

When the concentration of the degradation products in the lean solvent 15$b$ is reduced below a predetermined value, the operation of removing the degradation products is stopped.

It may be configured such that the operation can be performed when the degradation products from CO (the concentration of the heat stable salt) exceed a degradation product removal start reference value, for example, two wt %.

Moreover, it can be configured such that the operation can be performed when the degradation products from Fe (for example, glycines such as bicine) exceed a degradation product removal start reference value, for example, five ppm.

It can be configured to start the degradation product removal operation when either of the degradation products from CO (the concentration of heat stable salt) or the degradation products from Fe (glycines such as bicine) reaches its reference value if both of the values of the degradation products are measured.

The concentrations of the degradation products are examples, and are changed as appropriate according to the kind of the absorbent such as an amine-based solvent of the absorbent 15, and conditions in the acid gas removal unit 16.

A sudden increase in iron concentration is expected. Accordingly, it is necessary to perform concentration monitoring separately and frequently.

The degradation products may be monitored by an automatic or manual analysis operation and determined by unillustrated determination means.

It is preferred that an amine-based solvent be used as the absorbent 15 that absorbs the acid gas components ($CO_2$, $H_2S$). Examples of the amine-based solvent include methylethylamine (MEA).

Especially, solvents based on amines with low boiling points such as 1DMA2P (1-dimethylamino-2-propanol: boiling point 124° C.), DMAE (N,N-dimethylaminoethanol: boiling point 134° C.), MPZ (1-methylpiperazine: boiling point 138° C.), PZ (piperazine: boiling point 146° C.), 2 MPZ (2-methylpiperazine: boiling point 155° C.), DEAE (N,N-diethyl-2-aminoethanol: boiling point 161° C.), AMP (2-amino-2-methyl-1-propanol: boiling point 166° C.), EAE (2-ethylaminoethanol: boiling point 170° C.), monoethanolamine (MEA: boiling point 170° C.), nBAE (2-butylaminoethanol: boiling point 200° C.), 4AMPR (4-piperidinemethanamine: boiling point 200° C.) are used to facilitate, for example, the evaporation and separation of the degradation products.

This is because even if it is an amine-based solvent, if a solvent based on an amine with a high boiling point (247° C.) such as MDEA (N-methyldiethanolamine) is used, the evaporation and separation of the degradation products by evaporation using steam are difficult and recycling is not efficient.

A degraded concentrate 29 concentrated in the degradation product removal unit 17 is discharged out of the system.

A stripped gas 30 of the absorbent produced when being concentrated in the degradation product removal unit 17 is returned to the lower side of the regenerator 16$b$.

As described above, according to the embodiment, the degradation product removal unit 17 can separate the degradation products in the absorbent 15 that circulates through the absorber 16a and the regenerator 16b and accordingly the need of frequent replacement of the absorbent 15 is eliminated, which enables the promotion of a dramatic reduction in the amount of use of the solvent compared with before.

Moreover, the concentration of the solvent degradation products is continuously controlled. Accordingly, it is possible to suppress the occurrence of foaming, achieve stable operation, and also suppress corrosion of equipment.

The stabilization of the operation makes it possible to achieve the safe operation of the entire direct reduced iron process, and a reduction in cost by a reduction in the consumption amount of the solvent.

Second Embodiment

Figure 2:
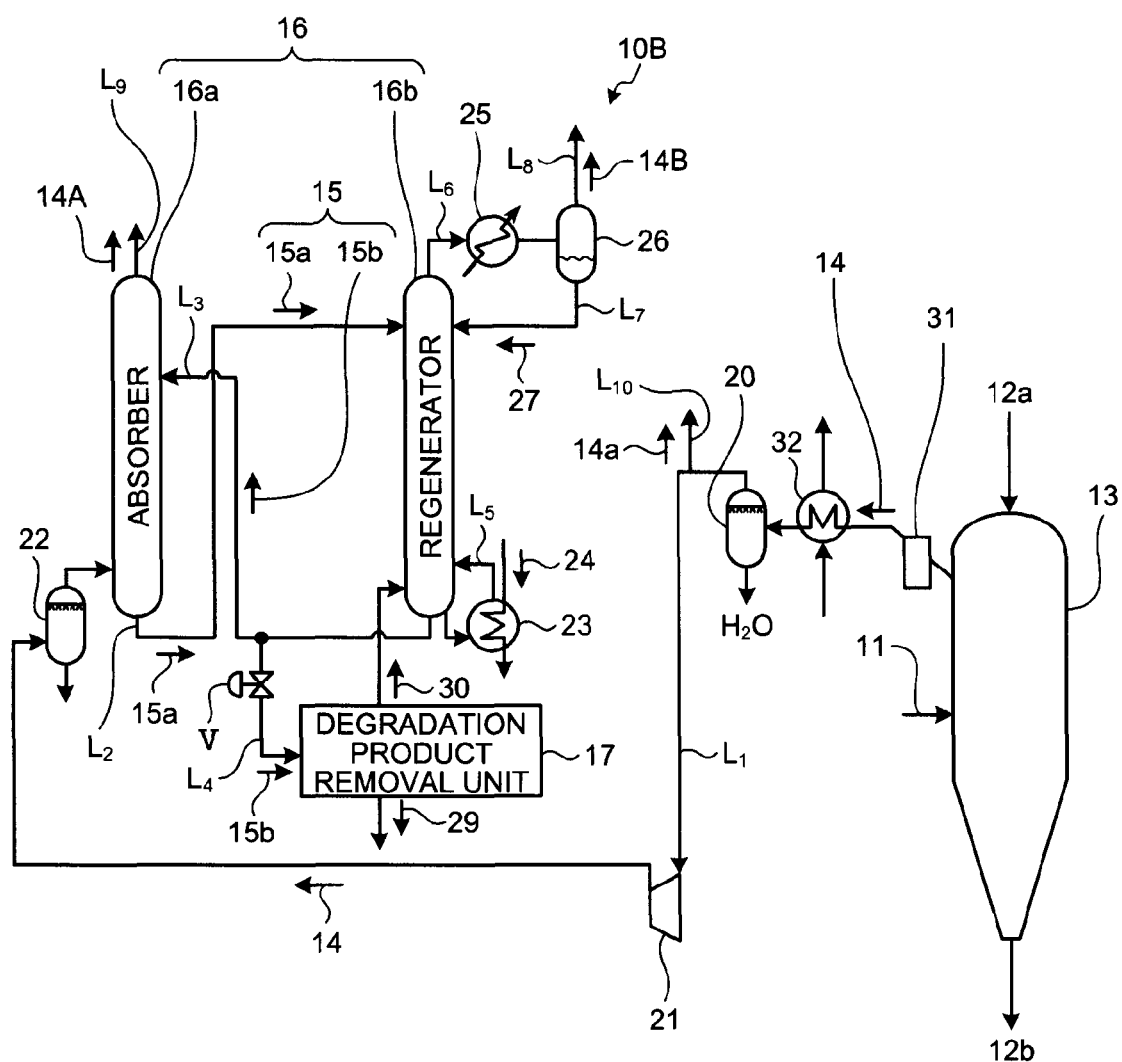
FIG. 2 is a schematic diagram of a direct reduced iron manufacturing system according to the second embodiment.

A direct reduced iron manufacturing system according to an embodiment by the present invention will be described with reference to the drawing. FIG. 2 is a schematic diagram of a direct reduced iron manufacturing system according to a second embodiment. The same reference numerals are assigned to the same configurations as the direct reduced iron manufacturing system 10A according to the first embodiment illustrated in FIG. 1, and their overlapping descriptions will be omitted.

As illustrated in FIG. 2, a direct reduced iron manufacturing system 10B of the embodiment includes, in the direct reduced iron manufacturing system 10A of the first embodiment illustrated in FIG. 1, a bag filter 31 and a heat exchanger 32, which are installed on the gas supply line $L_1$ that supplies the reduction furnace flue gas 14.

The installation of the bag filter 31 promotes the efficiency of removing dust in the reduction furnace flue gas 14 prior to the process in the scrubber 20. Moreover, the dust in the reduction furnace flue gas 14 supplied to the heat exchanger 32 is removed to maintain the heat exchange efficiency of the heat exchanger 32.

The reboiler 23 and the degradation product removal unit 17 each need a heat source. However, in the embodiment, it makes it possible to generate the steam 24 by the heat exchanger 32 installed as the heat source on the gas supply line $L_1$ and use the vapor of the generated steam 24.

Third Embodiment

Figure 3:
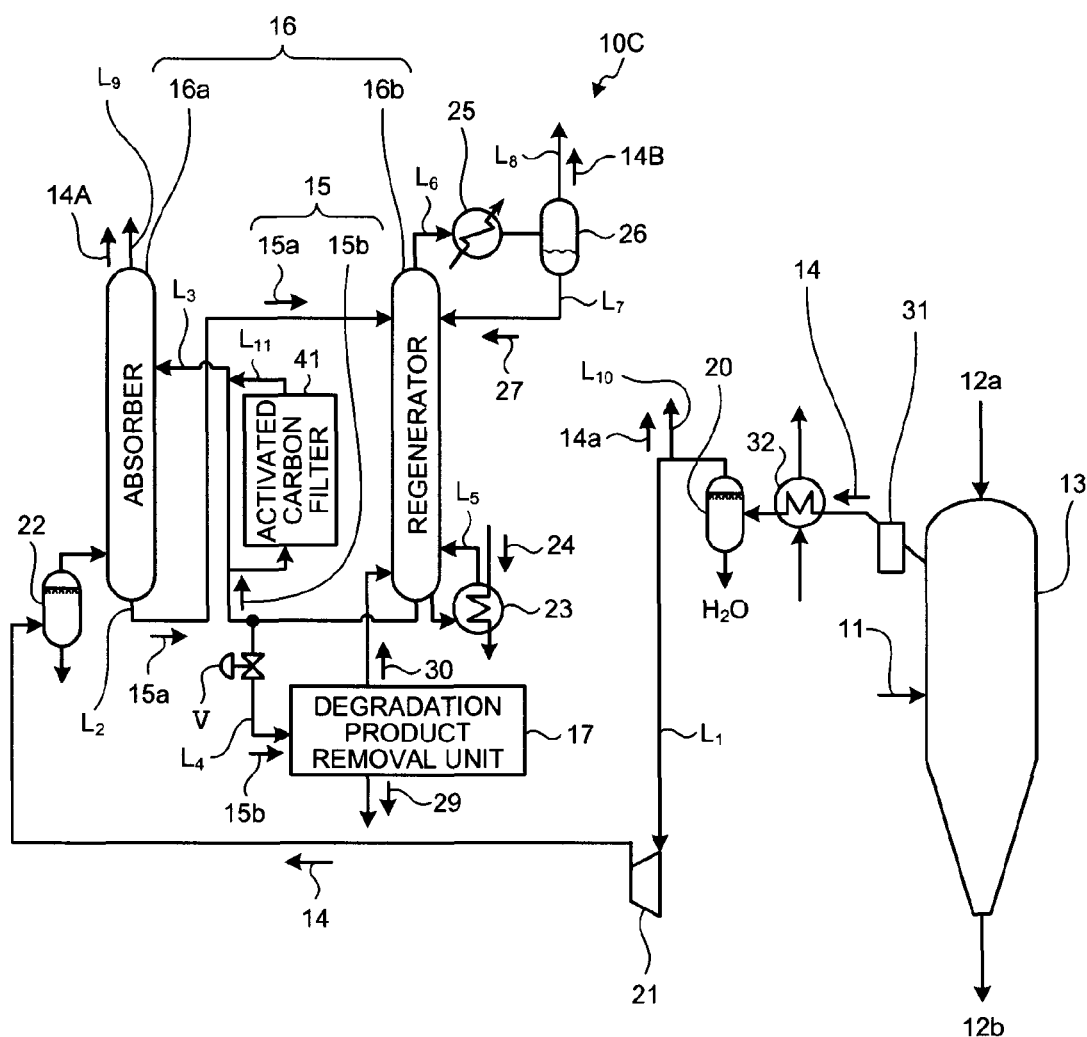
FIG. 3 is a schematic diagram of a direct reduced iron manufacturing system according to the third embodiment.

A direct reduced iron manufacturing system according to an embodiment by the present invention will be described with reference to the drawing. FIG. 3 is a schematic diagram of a direct reduced iron manufacturing system according to a third embodiment. The same reference numerals are assigned to the same configurations as the direct reduced iron manufacturing systems 10A and 10B according to the first and second embodiments illustrated in FIGS. 1 and 2, and their overlapping descriptions will be omitted.

As illustrated in FIG. 3, a direct reduced iron manufacturing system 10C of the embodiment includes, in the direct reduced iron manufacturing system 10B illustrated in FIG. 2, a lean solvent bypass line $L_{11}$ that bypasses a part of the lean solvent 15b to be introduced into the absorber 16a from the regenerator 16b, and a filter 41 interposed on the lean solvent bypass line $L_{11}$.

The filter 41 is installed in the system to further remove degradation products, impurities, and the like that cannot be removed in the degradation product removal unit 17, which enables long-term maintenance of the performance of the absorbent 15 such as an amine-based solvent.

The components that cannot be removed in the degradation product removal unit 17 include a volatile degradation promoting substance with a boiling point lower than the absorbent such as an amine-based solvent.

In the embodiment, an activated carbon filter is used as the filter 41. However, as long as the filter can remove impurities, the filter is not limited to the activated carbon filter.

The amount of the lean solvent 15b to be bypassed to the lean solvent bypass line $L_{11}$ is set to approximately one-tenth of the total amount. However, it may be adjusted as appropriate depending on the concentration of impurities.

Fourth Embodiment

Figure 4:
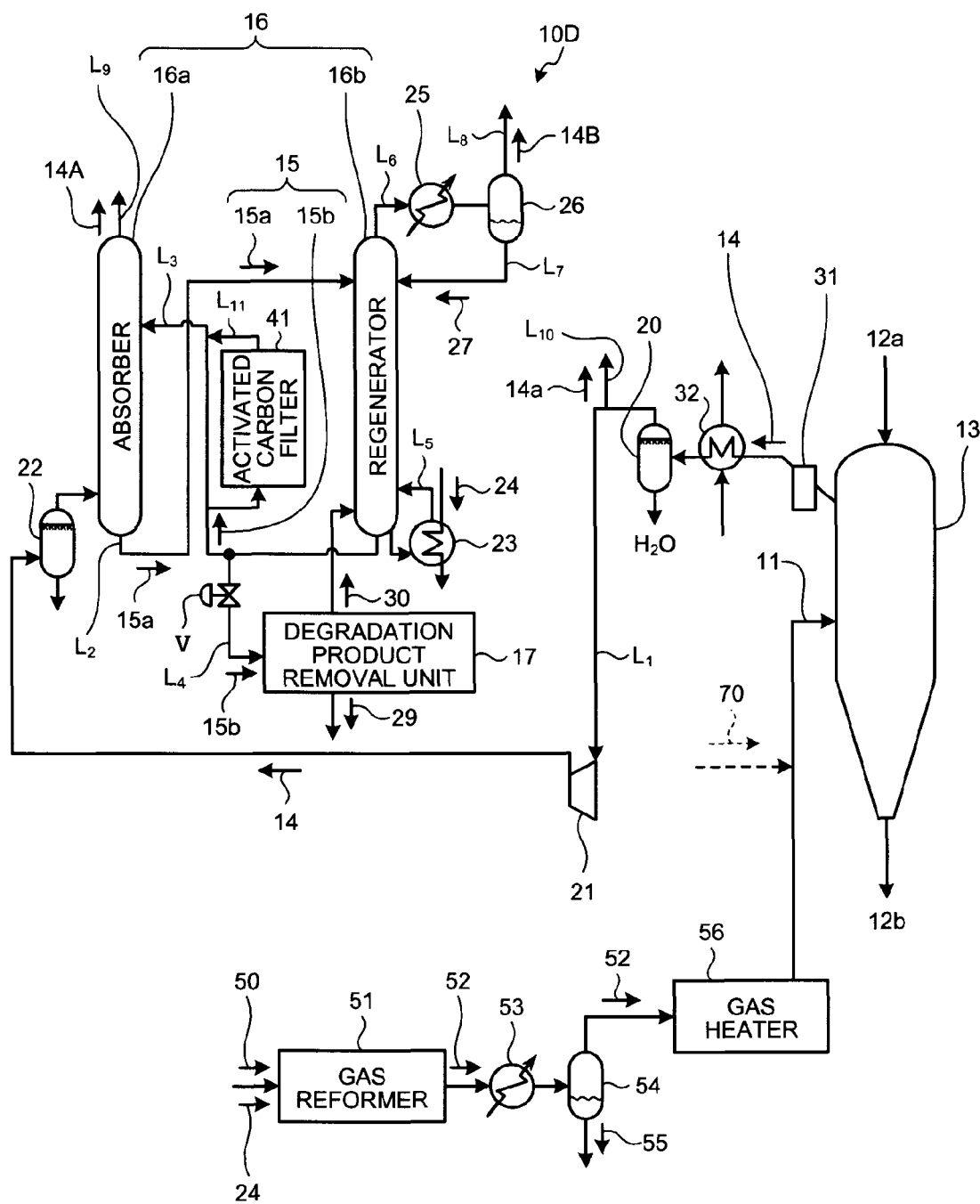
FIG. 4 is a schematic diagram of a direct reduced iron manufacturing system according to the fourth embodiment.
Figure 5:
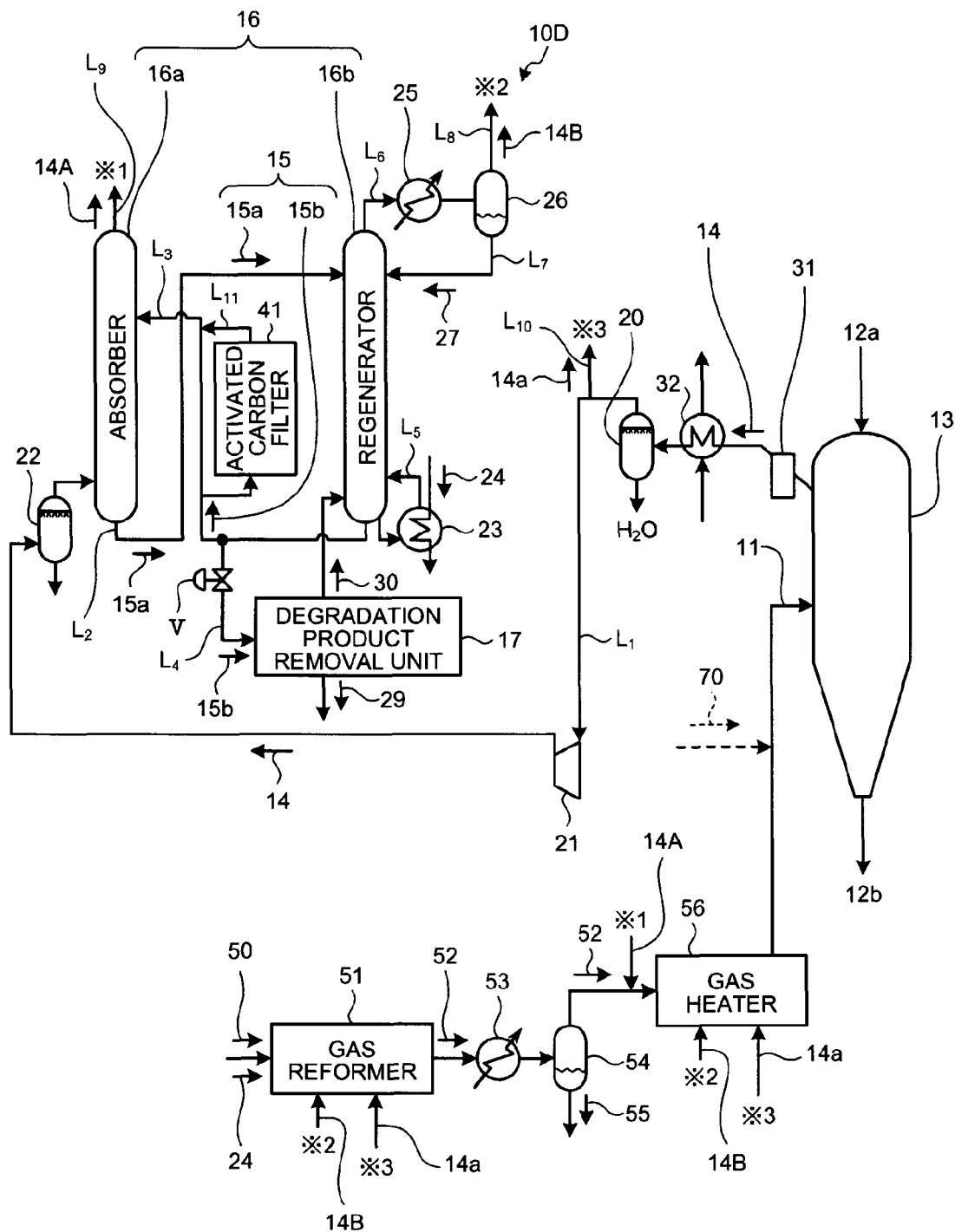
FIG. 5 is a schematic diagram of another direct reduced iron manufacturing system according to the fourth embodiment.

A direct reduced iron manufacturing system according to an embodiment by the present invention will be described with reference to the drawings. FIG. 4 is a schematic diagram of a direct reduced iron manufacturing system according to a fourth embodiment. FIG. 5 is a schematic diagram of another direct reduced iron manufacturing system according to the fourth embodiment. The same reference numerals are assigned to the same configurations as the direct reduced iron manufacturing systems 10A to 10C according to the first to third embodiments illustrated in FIGS. 1 to 3, and their overlapping descriptions will be omitted.

As illustrated in FIG. 4, a direct reduced iron manufacturing system 10D of the embodiment illustrates a case of using natural gas as the reducing gas 11.

It is configured such that if gas from natural gas 50 is reformed to supply the reducing gas 11, a gas reformer (hereinafter referred to as the "reformer") 51 for reforming the natural gas 50 is provided, and the steam 24 is supplied to cause a steam reforming reaction, a carbon dioxide reforming reaction, or a reaction of their combination, which leads to the inversion of the natural gas 50 into hydrogen ($H_2$) and carbon monoxide (CO), and a reformed gas 52 mainly including hydrogen ($H_2$) and carbon monoxide (CO) is obtained.

The reformed gas 52, which has been reformed in the reformer 51, is gas-cooled in a gas cooler 53. Afterward, condensed water 55 is separated from the reformed gas 52 in a gas-liquid separator 54.

The reformed gas 52 from which the water has been separated is introduced into a gas heater 56, heated to a predetermined temperature (for example, 900 to 1,050° C.), and supplied as the reducing gas 11 into the reduction furnace 13.

Moreover, if the purified gas 14A, which has been purified in the absorber 16a, joins the natural gas 50 side in the direct reduced iron manufacturing system 10D of the fourth embodiment, as illustrated in FIG. 5, a purified gas supply line (*1) is provided such that the purified gas 14A joins the reformed gas 52 after the separation of the condensed water 55 in the gas-liquid separator 54.

It is configured such that if the purified gas 14A joins the reformed gas 52, the gas is adjusted to have a reducing gas composition ideal for a reduction reaction in the reduction furnace 13 and introduced into the reformer 51.

Moreover, the recovery gas 14B released from the regenerator 16b mainly includes $CO_2$ and $H_2S$, and is introduced into a reforming furnace of the gas reformer 51 or a furnace of the gas heater 56 by providing a recovery gas supply line (*2).

H₂S is then burned in the furnace to form sulfur dioxide ($SO_2$), which is diluted by a large amount of combustion gas discharged from the furnaces, and then an appropriate process (for example, a desulfurization process) is performed thereon as flue gasses from the furnaces to be released into the atmosphere.

Consequently, $H_2S$ in the recovery gas 14B to be released from the regenerator 16b is prevented from being discharged directly out of the system. Moreover, if $H_2S$ is treated, for example, with a catalyst, the catalyst used is degraded. Accordingly, it is necessary to replace the catalyst as occasion demands. However, if a combustion process is performed as in the embodiment, the replacement becomes unnecessary, which is economic.

The steam generated by waste heat of the reforming furnace, and the steam generated by the heat recovered in the cooler 53 for removing water in the reformed gas 52 emitted from the gas reformer 51 can be used as the steam 24 of the reboiler 23 and the degradation product removal unit 17 described above.

Moreover, in order to avoid the accumulation of $CH_4$ and $N_2$ being system inert components in the system, the part 14a of the gas emitted from the scrubber 20 is introduced into the reforming furnace of the gas reformer 51 or the furnace of the gas heater 56 by providing a reduction furnace flue gas supply line (*3), and the combustion process can be performed here on the part 14a.

Moreover, waste heat of the flue gas of the gas reformer 51 or the furnace of the gas heater 56 is fully recovered by, for example, heat recovery means such as a heat exchanger, and the flue gas is then discharged. For example, steam is manufactured by the heat recovery means, and can be used in heat requiring units in the system, such as the reboiler 23 and the degradation product removal unit 17, used as the power of the compressor 21 by driving a steam turbine, or used as electric power by generating electric power.

Fifth Embodiment

Figure 6:
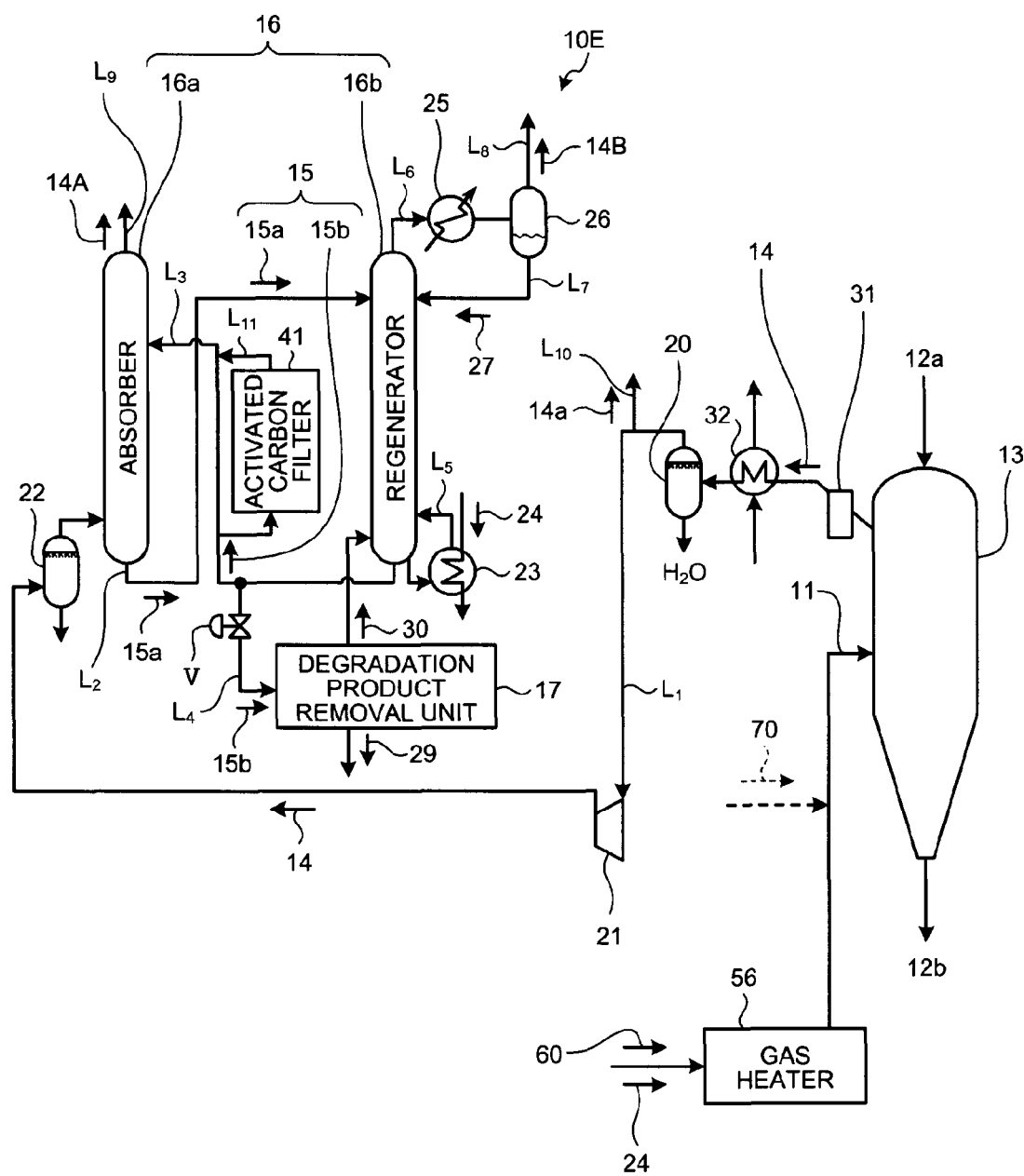
FIG. 6 is a schematic diagram of a direct reduced iron manufacturing system according to the fifth embodiment.
Figure 7:
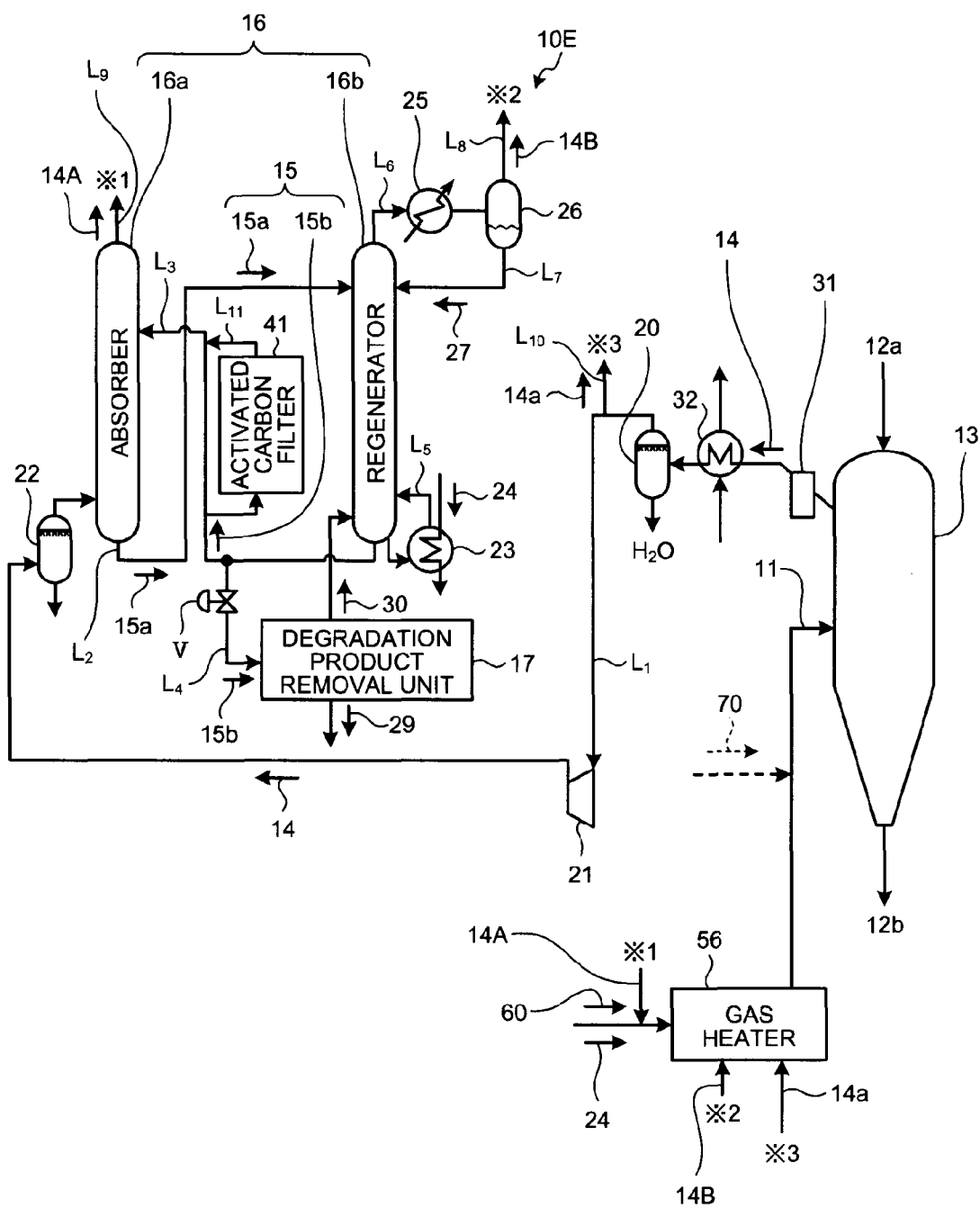
FIG. 7 is a schematic diagram of another direct reduced iron manufacturing system according to the fifth embodiment.

A direct reduced iron manufacturing system according to an embodiment by the present invention will be described with reference to the drawings. FIG. 6 is a schematic diagram of a direct reduced iron manufacturing system according to a fifth embodiment. FIG. 7 is a schematic diagram of another direct reduced iron manufacturing system according to the fifth embodiment. The same reference numerals are assigned to the same configurations as the direct reduced iron manufacturing systems 10A to 10D according to the first to fourth embodiments illustrated in FIGS. 1 to 5, and their overlapping descriptions will be omitted.

As illustrated in FIG. 6, a direct reduced iron manufacturing system 10E of the embodiment illustrates a case of using coal gasification gas 60 other than natural gas as the reducing gas 11.

In the embodiment, coal is gasified in a gasifier (not illustrated), and purified to obtain the coal gasification gas 60, which is heated by the gas heater 56 to be used as the reducing gas 11.

Moreover, it is also possible to use purified coke oven gas as the reducing gas 11 other than the coal gasification gas 60.

If the purified gas 14A joins the coal gasification gas 60 in the direct reduced iron manufacturing system 10E of the fifth embodiment, as illustrated in FIG. 7, it is configured such that the purified gas supply line (*1) is provided to cause the purified gas 14A to join the coal gasification gas 60, and the purified gas 14A is then heated up to a predetermined temperature in the gas heater 56 to form the reducing gas 11, and introduced into the reduction furnace 13.

Moreover, the recovery gas supply line (*2) is provided to introduce the recovery gas 14B released from the regenerator 16b into the furnace of the gas heater 56.

$H_2S$ is then burned in the furnace to form sulfur dioxide ($SO_2$), which is diluted by a large amount of combustion gas discharged from the furnaces, and then an appropriate process (for example, a desulfurization process) is performed thereon as flue gasses from the furnaces to be released into the atmosphere.

Moreover, in the fifth embodiment of FIGS. 6 and 7, the gas heater 56 may be omitted. If the gas heater 56 is omitted, it may be configured on an upstream side of the reduction furnace 13 such that a partial oxidation reaction is caused on the coal gasification gas 60 or the like by the introduction of a fuel 70 such as oxygen and natural gas to increase the amount of the reducing gas 11 as well as to internally heat the reducing gas 11 up to the necessary temperature (900 to 1050° C.), and then introduced into the reduction furnace 13.

The fuel 70 such as oxygen and natural gas may be supplied when necessary and increase the amount of the reducing gas 11 also in the direct reduced iron manufacturing system 10D of the fourth embodiment.

Moreover, also in the fifth embodiment, it may be configured such that in order to avoid the accumulation of $CH_4$ and $N_2$ being the system inert components in the system, the reduction furnace flue gas supply line (*3) is provided to introduce the part 14a of the gas emitted from the scrubber 20 into the furnace of the gas heater 56, and perform the combustion process therein.

REFERENCE SIGNS LIST 10A to 10E DIRECT REDUCED IRON MANUFACTURING SYSTEM
11 HIGH-TEMPERATURE REDUCING GAS
12a IRON ORE
12b REDUCED IRON
13 DIRECT REDUCTION FURNACE
14 REDUCTION FURNACE FLUE GAS
15 ACID GAS ABSORBENT (ABSORBENT)
16 ACID GAS REMOVAL UNIT
16a ACID GAS COMPONENT ABSORBER (ABSORBER)
16b REGENERATOR
17 DEGRADATION PRODUCT REMOVAL UNIT

The invention claimed is:

1. A direct reduced iron manufacturing system comprising:
a gas heater for heating a gas to produce a reducing gas;
a direct reduction furnace for reducing iron ore directly into reduced iron using a high-temperature reducing gas comprising hydrogen and carbon monoxide;
an acid gas removal unit including
an acid gas component absorber for removing, with an absorbent, an acid gas component in a reduction furnace flue gas discharged from the direct reduction furnace, and
a regenerator for releasing the acid gas; and
a degradation product removal unit for separating and removing a degradation product in the absorbent used by circulating between the acid gas component absorber and the regenerator, a purified gas supply line for joining a purifying gas purified in the absorber and comprising hydrogen and carbon monoxide to the gas, and a recovery gas supply line for supplying a recovery gas released from the regenerator and comprising $CO_2$ and $H_2S$ into the gas heater.

2. The direct reduced iron manufacturing system according to claim 1, further comprising:

a bypass circuit for bypassing a part of a lean solvent to be returned from the regenerator to the absorber; and a filter interposed in the bypass circuit.

3. The direct reduced iron manufacturing system according to claim 1, further comprising:

an introduction line for introducing the reduction furnace flue gas into the acid gas removal unit;

a heat exchanger, interposed on the introduction line, for heat exchanging the reduction furnace flue gas;

a bag filter provided upstream of the heat exchanger; and a scrubber provided downstream of the heat exchanger.

4. The direct iron manufacturing system according to claim 3, further comprising a reduction furnace flue gas supply line for supplying a part of the reduction furnace flue gas emitted from the scrubber and comprising $CH_4$ and $N_2$ to the gas heater.

5. The direct iron manufacturing system comprising:

a gas heater for heating a gas to produce a reducing gas;

a direct reduction furnace for reducing iron ore directly into reduced iron using a high-temperature reducing gas comprising hydrogen and carbon monoxide;

an acid gas removal unit including an acid gas component absorber for removing, with an absorbent, an acid gas component in a reduction furnace flue gas discharged from the direct reduction furnace, and a regenerator for releasing the acid gas;

an introduction line for introducing the reduction furnace flue gas into the acid gas removal unit;

a heat exchanger, interposed on the introduction line, for heat exchanging the reduction furnace flue gas;

a bag filter provided upstream of the heat exchanger;

a scrubber provided downstream of the heat exchanger; and a reduction furnace flue gas supply line for supplying a part of the reduction furnace flue gas emitted from the scrubber and comprising $CH_4$ and $N_2$ to the gas heater.

6. The direct iron manufacturing system according to claim 5, further comprising:

a bypass circuit for bypassing a part of a lean solvent to be returned from the regenerator to the absorber; and a filter interposed in the bypass circuit.

7. The direct iron manufacturing system according to claim 1, wherein the direct reduction furnace is configured to intake reducing gas produced from natural gas, coal gasification gas or coke over gas.

8. The direct iron manufacturing system according to claim 5, wherein the direct reduction furnace is configured to intake reducing gas produced from natural gas, coal gasification gas or coke over gas.

* * * * *